(12) United States Patent
Si et al.

(10) Patent No.: US 9,467,457 B2
(45) Date of Patent: Oct. 11, 2016

(54) IDENTITY MANAGEMENT AND AUTHENTICATION SYSTEM FOR RESOURCE ACCESS

(71) Applicant: Oracle International Corporation, Redwood Shores, CA (US)

(72) Inventors: Xiaohong Si, Beijing (CN); Wen Feng Liu, Beijing (CN); Per Nyfelt, Bromma (SE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/595,456

(22) Filed: Jan. 13, 2015

(65) Prior Publication Data
US 2016/0205108 A1  Jul. 14, 2016

(51) Int. Cl.
*G06F 7/04* (2006.01)
*H04L 29/06* (2006.01)
*H04L 29/08* (2006.01)

(52) U.S. Cl.
CPC ........... *H04L 63/102* (2013.01); *H04L 63/083* (2013.01); *H04L 63/0815* (2013.01); *H04L 67/02* (2013.01)

(58) Field of Classification Search
CPC ... H04L 63/102; H04L 67/02; H04L 63/083; H04L 63/0815
See application file for complete search history.

(56) References Cited

U.S. PATENT DOCUMENTS

| | | | | |
|---|---|---|---|---|
| 2012/0096521 A1* | 4/2012 | Peddada | ............... | G06F 21/629 726/4 |
| 2013/0086645 A1* | 4/2013 | Srinivasan | .............. | H04L 63/10 726/4 |
| 2014/0068743 A1* | 3/2014 | Marcus | ................... | G06F 21/33 726/8 |
| 2014/0096224 A1 | 4/2014 | Liu et al. | | |

OTHER PUBLICATIONS

Martin Keen et al., "Developing Web Services Applications," Copyright IBM Corp. 2012, pp. 1-126.*
Tim Reimer et al. "Federated Idenity Access Broker Pattern for Cloud Computing," 2013 16th International Conference on Network-Based Information Systems, 2013 IEEE, pp. 134-140.*
Eghbak Ghazizadeh et al. "A Survey on Security Issues of Federated Identity in the Cloud Computing," 2012 IEEE 4th International Conference on Cloud Computing Technology and Science, 2012 IEEE, pp. 562-656.*

* cited by examiner

*Primary Examiner* — Luu Pham
*Assistant Examiner* — Cahn Le
(74) *Attorney, Agent, or Firm* — Miles & Stockbridge P.C.

(57) ABSTRACT

A system that authorizes access to a resource by a client validates the client and generates a Security Assertion Markup Language ("SAML") assertion for the valid client. The system then sends an access request with the SAML assertion to a OAuth server. In response, the OAuth server returns an access token for the resource to the client.

20 Claims, 6 Drawing Sheets

IDENTITY MANAGEMENT AND AUTHENTICATION SYSTEM FOR RESOURCE ACCESS

FIELD

One embodiment is directed generally to a computer system, and in particular to a computer system that provides identity management and authentication in response to a request for resources.

BACKGROUND INFORMATION

An identity management system is an information system, or a set of technologies, that can be used for enterprise or cross-network identity management. Identity management describes the management of individual identities, and the authentication, authorization, roles, and privileges within or across system and enterprise boundaries with the goal of increasing security and productivity while decreasing cost, downtime, and repetitive tasks. One aspect of identity management is "single sign-on" ("SSO"). One standard that is particularly useful in the field of identity management is "OAuth."

OAuth is an open standard for authorization. An indirect effect of authorization is authentication. OAuth allows users to share their private resources (e.g., photos, videos, contact lists, etc.) stored on one site with another site without having to hand out their credentials, typically supplying username and password tokens instead. Each token grants access to a specific site for specific resources and for a defined duration. This allows a user to grant to a third party site access to their information stored with another service provider, without sharing their access permissions or the full extent of their data. For example, a token might grant access to a video editing site for videos from a specific album for the next two hours.

SUMMARY

One embodiment is a system that authorizes access to a resource by a client. The system validates the client and generates a Security Assertion Markup Language ("SAML") assertion for the valid client. The system then sends an access request with the SAML assertion to a OAuth server. In response, the OAuth server returns an access token for the resource to the client.

DETAILED DESCRIPTION

One embodiment is a OAuth based single sign-on ("SSO") authentication system that uses Security Assertion Markup Language ("SAML") as assertion grants. Therefore, the integration client, which is used to integrate different identity management platforms, merely needs to provide valid SAML assertions. Users from different identity management platforms can then access the resources protected by a OAuth Server, and the SSO function is implemented.

Figure 1:
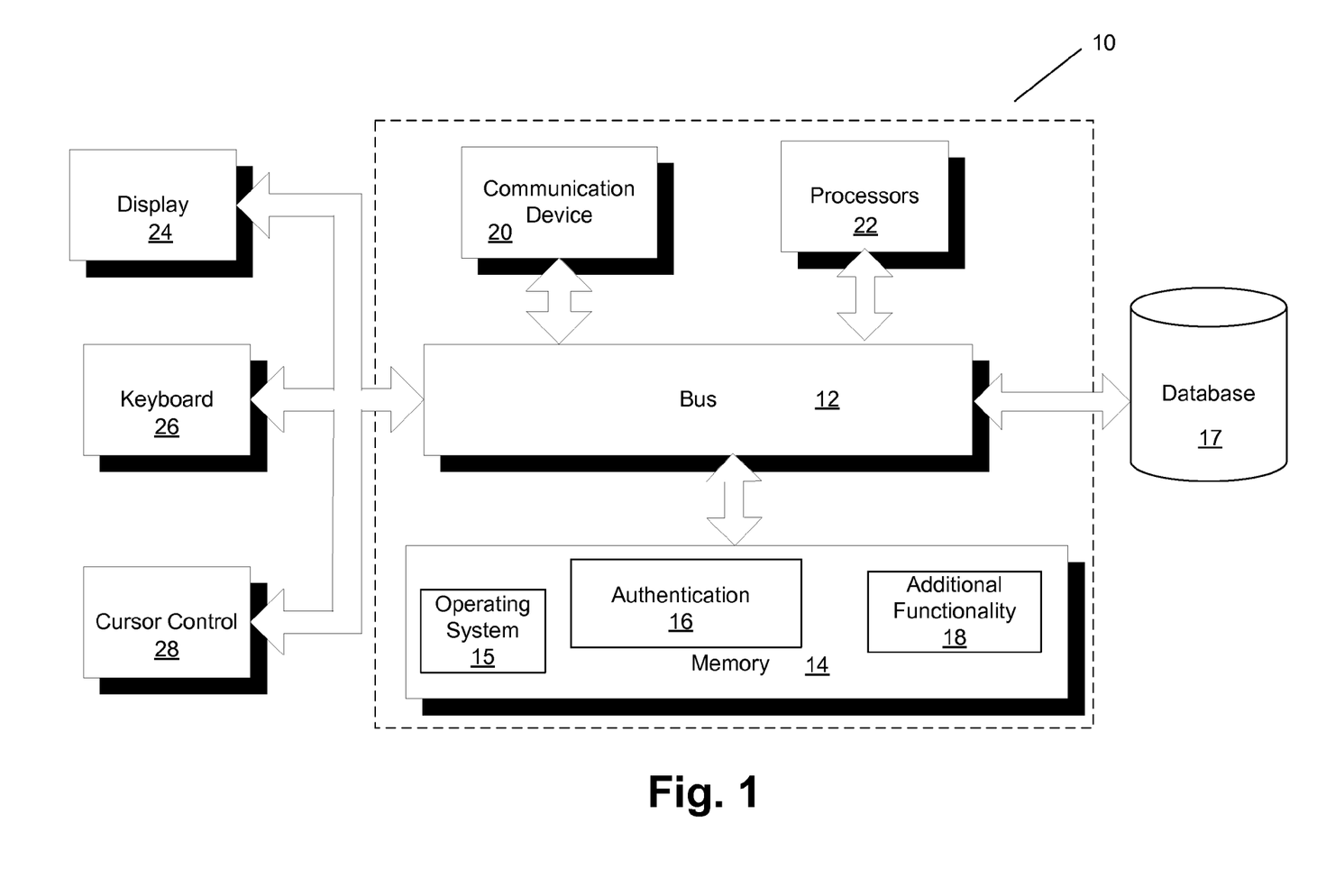
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include an authentication module 16 for providing authentication for resource access, and all other functionality disclosed herein. System 10 can be part of a larger system, such as a webserver and any other associated functionality. Therefore, system 10 can include one or more additional functional modules 18 to include the additional functionality. In one embodiment, the additional functionality is an identity management platform such as "Oracle Identity Management" from Oracle Corp., or "Oracle Communications Services Gatekeeper" ("OCSG") from Oracle Corp. A database 17 is coupled to bus 12 to provide centralized storage for modules 16 and 18 and store profiles, identities, protected resources, etc.

Many customers typically desire to integrate their existing identity management platform to a new deployed system and use a OAuth server to resolve the single sign-on issue. A known solution is to build a private interface between the identity management platform and the OAuth server. However, this requires modifications to both the identity management platform and the OAuth server, and may lead to an OAuth server that can support only a few specific identity management platforms.

In contrast, embodiments provide a "generic" mechanism for transporting assertions during interactions with a token endpoint, and rules for the content and processing of SAML assertions so that an unmodified OAuth server can be used. Embodiments further provide an enhanced security profile by using derived values, such as signatures or keyed-hash message authentication codes ("HMACs"), as well as facilitating the use of "OAuth 2.0" in client-server integration scenarios where the end-user may not be present.

As discussed, OAuth is an open standard to authorization. OAuth provides client applications with a "secure delegated access" to server resources on behalf of a resource owner. It specifies a process for resource owners to authorize third-party access to their server resources without sharing their credentials. Designed specifically to work with Hypertext Transfer Protocol ("HTTP"), OAuth essentially allows access tokens to be issued to third-party clients by an authorization server, with the approval of the resource owner, or end-user. The client then uses the access token to access the protected resources hosted by the resource server.

OAuth 2.0 is the next generation of the OAuth protocol and is not backwards compatible with the original OAuth (i.e., OAuth 1.0). OAuth 2.0 focuses on client developer simplicity while providing specific authorization flows for web applications, desktop applications, mobile phones, and living room devices. The specification and requirements for the OAuth 2.0 framework are disclosed by the Internet Engineering Task Force ("IETF"), in for example, Request for Comments: 6749, and are hereby incorporated by reference.

Embodiments use Security Assertion Markup Language ("SAML") assertions as authorization grants with OAuth 2.0. SAML is an Extensible Markup Language ("XML")-based, open-standard data format for exchanging authentication and authorization data between parties, in particular, between an identity provider and a service provider. The SAML version 2.0 specification (the "SAML specification") was approved as an OASIS Standard in March 2005, the disclosure of which is hereby incorporated by reference.

The SAML specification defines three roles: the principal (typically a user), the identity provider ("IdP"), and the service provider ("SP"). In the use case addressed by SAML, the principal requests a service from the service provider. The service provider requests and obtains an identity assertion from the identity provider. On the basis of this assertion, the service provider can make an access control decision. An access control decision is a decision on whether to perform some service for the connected principal.

Before delivering the identity assertion to the SP, the IdP may request some information from the principal—such as a user name and password—in order to authenticate the principal. SAML specifies the assertions between the three parties, in particular, the messages that assert identity that are passed from the IdP to the SP. In SAML, one identity provider may provide SAML assertions to many service providers. Similarly, one SP may rely on and trust assertions from many independent IdPs.

SAML does not specify the method of authentication at the identity provider. It may use a username and password, or other form of authentication, including multi-factor authentication. A directory service, such as Lightweight Directory Access Protocol ("LDAP"), Remote Authentication Dial In User Service ("RADIUS") and Active Directory, which allows users to log in with a user name and password, is a typical source of authentication tokens (e.g., passwords) at an identity provider.

Figure 2:
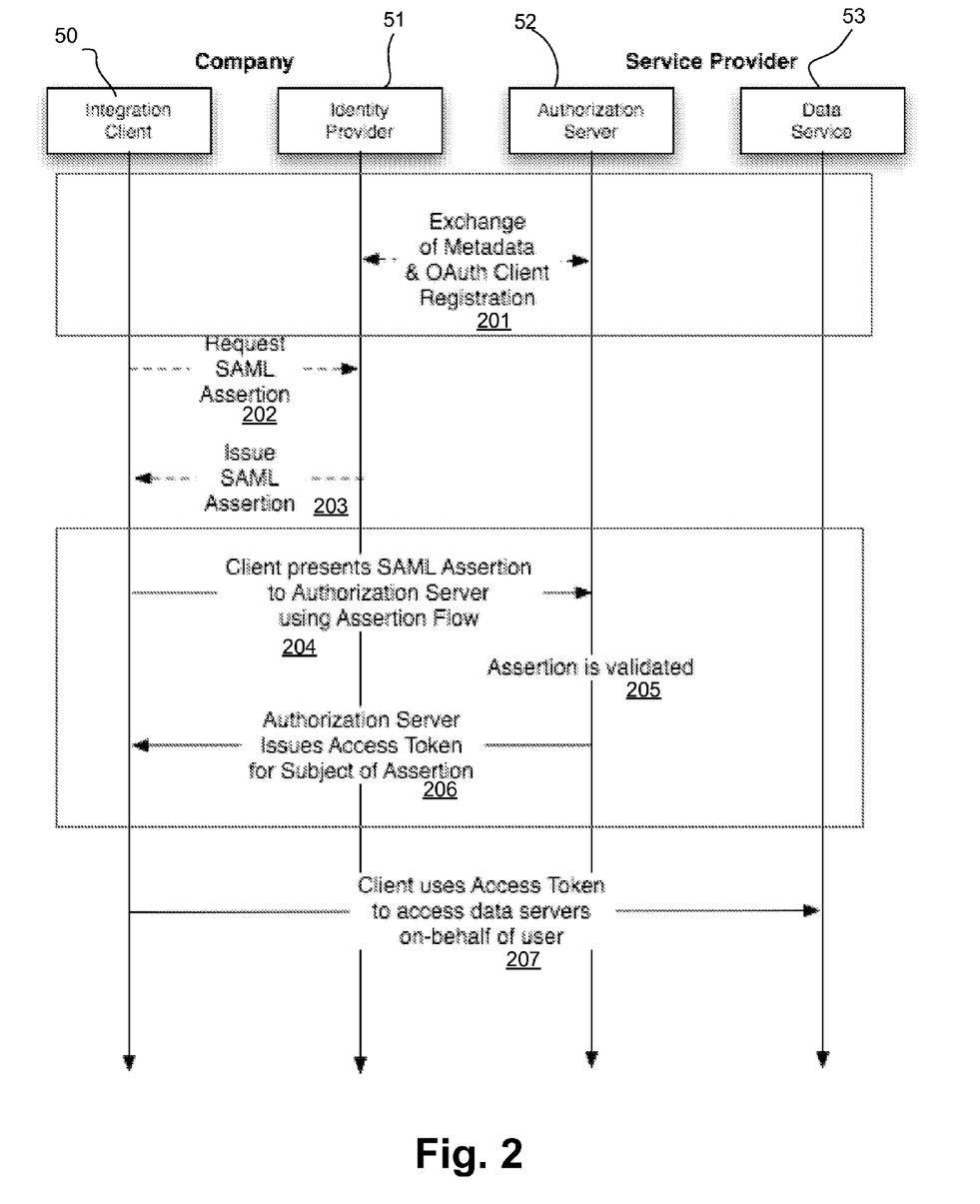
FIG. 2 illustrates an example assertion flow diagram between network elements for identity management and authorization in accordance with embodiments of the present invention.

FIG. 2 illustrates an example assertion flow diagram between network elements for identity management and authorization in accordance with embodiments of the present invention. In one embodiment, the functionality of the flow diagram of FIG. 2 (and FIGS. 5 and 6 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The network elements of FIG. 2 include an integration client 50 which is an application making protected resource requests on behalf of the resource owner and with its authorization. Client 50 corresponds to the "Client" disclosed in the OAuth2 specification. Identity provider 51 is the third party identity server which authorizes the resource owner. Authorization server 52 is a server that issues access tokens to client 50 after successfully authenticating the resource owner and obtaining authorization. Authorization server 52 corresponds to the "Authorization Server" disclosed in the OAuth2 specification. Data service server 53 is a server hosting the protected resources and capable of accepting and responding to protected resource requests using access tokens. Data service server 53 corresponds to the "Resource Server" disclosed in the OAuth2 specification. Any of the network elements of FIG. 2 can be implemented by server 10 of FIG. 1.

At 201, between identity provider 51 and authorization server 52, the partner relationship is established by synchronizing the client's metadata and related certificates.

At 202, client 50 sends an SAML assertion authorization request to identity provider 51 and in response is issued a valid SAML assertion with a digital signature at 203.

At 204, client 50 sends the SAML assertion to authorization server 52 to request an access token.

At 205, authorization server 52 validates the SAML assertion and client metadata, and then issues the client a valid access token at 206.

At 207, with the access token, client 50 can visit and access the protected resource in data service 53.

In one embodiment, the functionality of authentication module 16 of FIG. 1 is implemented as a web servlet on identity provider 51 of FIG. 2. A servlet is a Java programming language class used to extend the capabilities of a server. Although servlets can respond to any types of requests, they are commonly used to extend the applications hosted by web servers, so they can be considered analogous to Java applets that run on servers instead of in web browsers. Servlets are typically used to process or store data that was submitted from a HyperText Markup Language ("HTML") form, provide dynamic content such as the results of a database query, and manage state information that does not exist in the stateless HTTP protocol, such as filling the articles into the shopping cart of the appropriate customer.

Technically, a "servlet" is a Java class in Java EE that conforms to the Java Servlet application programming interface ("API"), a standard for implementing Java classes which respond to requests. Servlets can in general communicate over any client/server protocol, but they are most often used with the HTTP protocol.

A software developer may use a servlet to add dynamic content to a web server using the Java platform. The generated content is commonly HTML, but may be other data such as Extensible Markup Language ("XML"). Servlets can maintain state in session variables across many server transactions by using HTTP cookies, or uniform resource locator ("URL") rewriting.

To deploy and run a servlet, a web container is used. A web container (also referred to as a "servlet container") is essentially the component of a web server that interacts with the servlets. The web container is responsible for managing the lifecycle of servlets, mapping a URL to a particular servlet, and ensuring that the URL requester has the correct access rights.

The servlet API, contained in the Java package "hierarchy javax.servlet," defines the expected interactions of the web container and a servlet. The basic servlet package defines Java objects to represent servlet requests and responses, as well as objects to reflect the servlet's configuration parameters and execution environment. The package "javax.servlet.http" defines HTTP-specific subclasses of the generic servlet elements, including session management objects that track multiple requests and responses between the web server and a client. Servlets may be packaged in a Web application Archive ("WAR") file as a web application.

Figure 3:
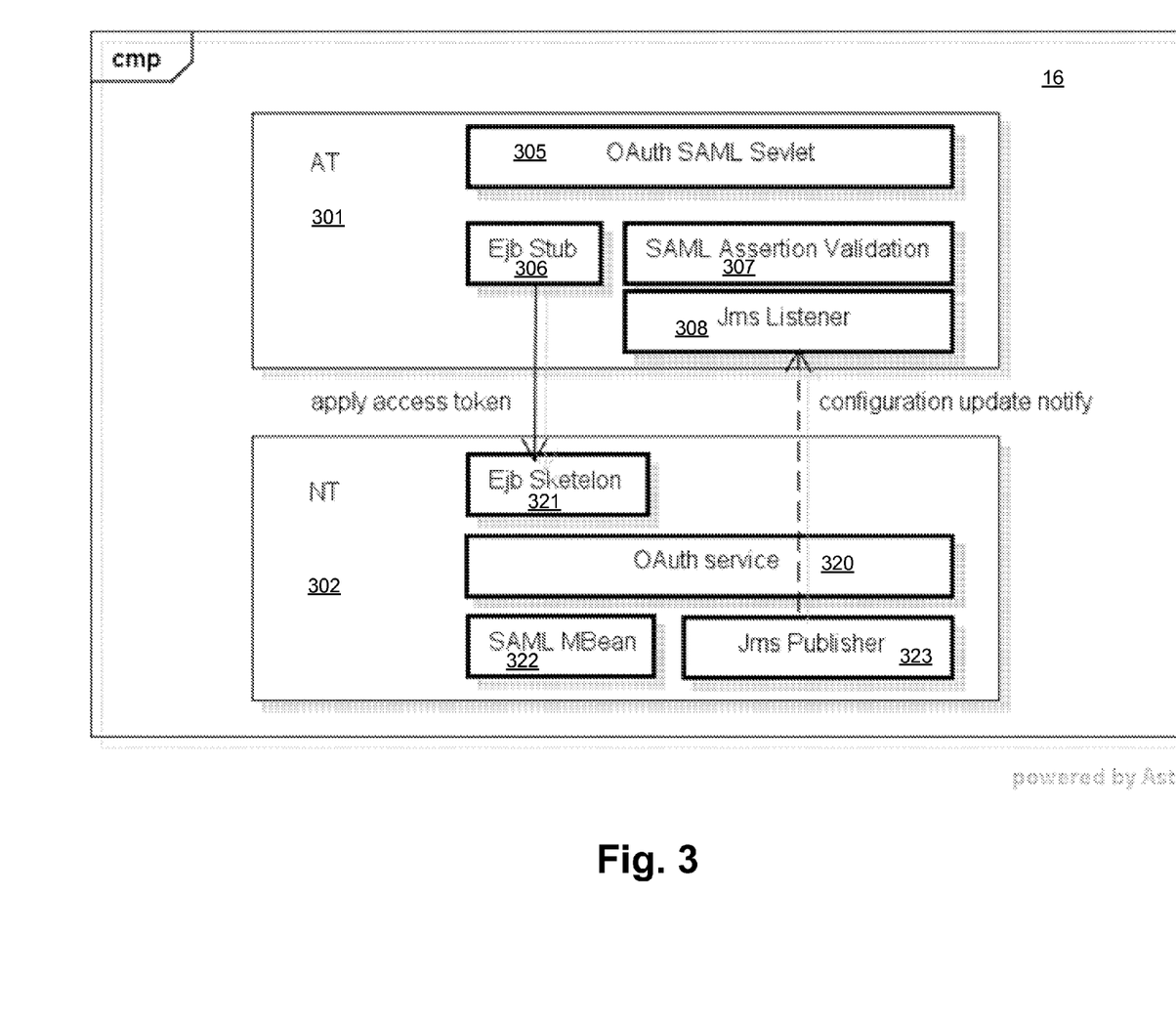
FIG. 3 is a block diagram of the functionality of an authentication module of FIG. 1 when executed by a processor, including a web servlet and associated functionality that implements one embodiment of the present invention.

FIG. 3 is a block diagram of the functionality of authentication module 16 of FIG. 1 when executed by a processor, including a web servlet and associated functionality that implements one embodiment of the present invention. Module 16 includes an Access Tier ("AT") 301 and a Network Tier ("NT") 302. AT 301 includes a OAuth SAML servlet 305 that receives an access token request with a signed SAML assertion. After validating that SAML assertion, servlet 305 invokes an "ApplyAccessToken" to get the token remotely from NT 302.

AT 301 further includes an Enterprise JavaBeans ("EJB") stub 306 which is an EJB client to apply access token or reload configuration (e.g., Certificates) from the OAuth service 320 in NT 302. An SAML assertion validation 307 is a utility to verify SAML assertion. A Java Message Service ("JMS") listener 308 listens to SAML related configuration updates and reloads configurations (e.g., Certificates) from NT 302.

NT 302 includes OAuth service 320, which provides most of the logic described herein to provide authorization server functions. EJB skeleton 321 is an EJB home to issue access token or reload configuration (e.g., Certificates). An SAML MBean 322 provides management to add/list/remove the identity provider's certificate and restricted audience URLs. A JMS publisher 323 publishes SAML related configuration updates to AT 301.

Figure 4:
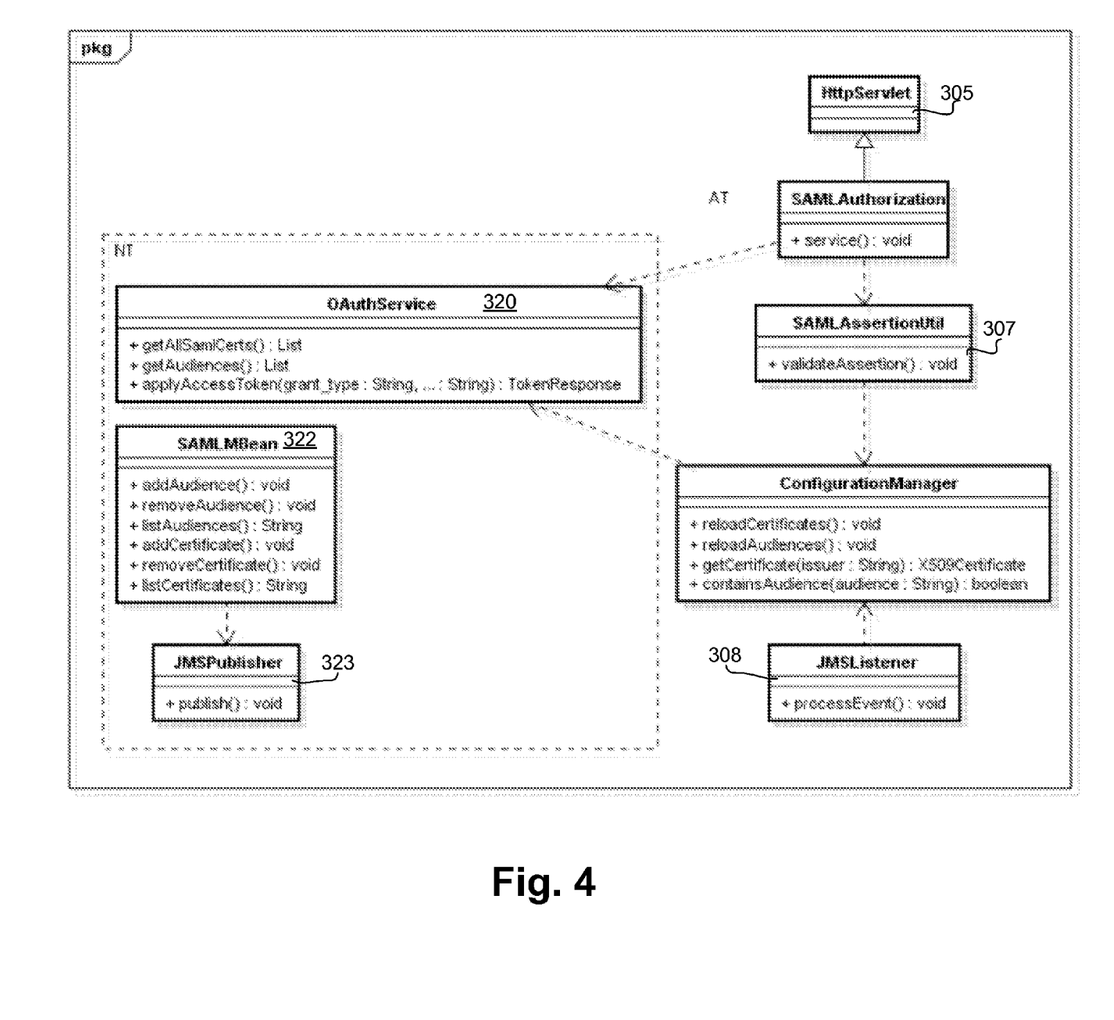
FIG. 4 is a block diagram overview of the JAVA classes that implement the functionality of FIG. 3 in accordance with one embodiment.

FIG. 4 is a block diagram overview of the JAVA classes that implement the functionality of FIG. 3 in accordance with one embodiment.

Figure 5:
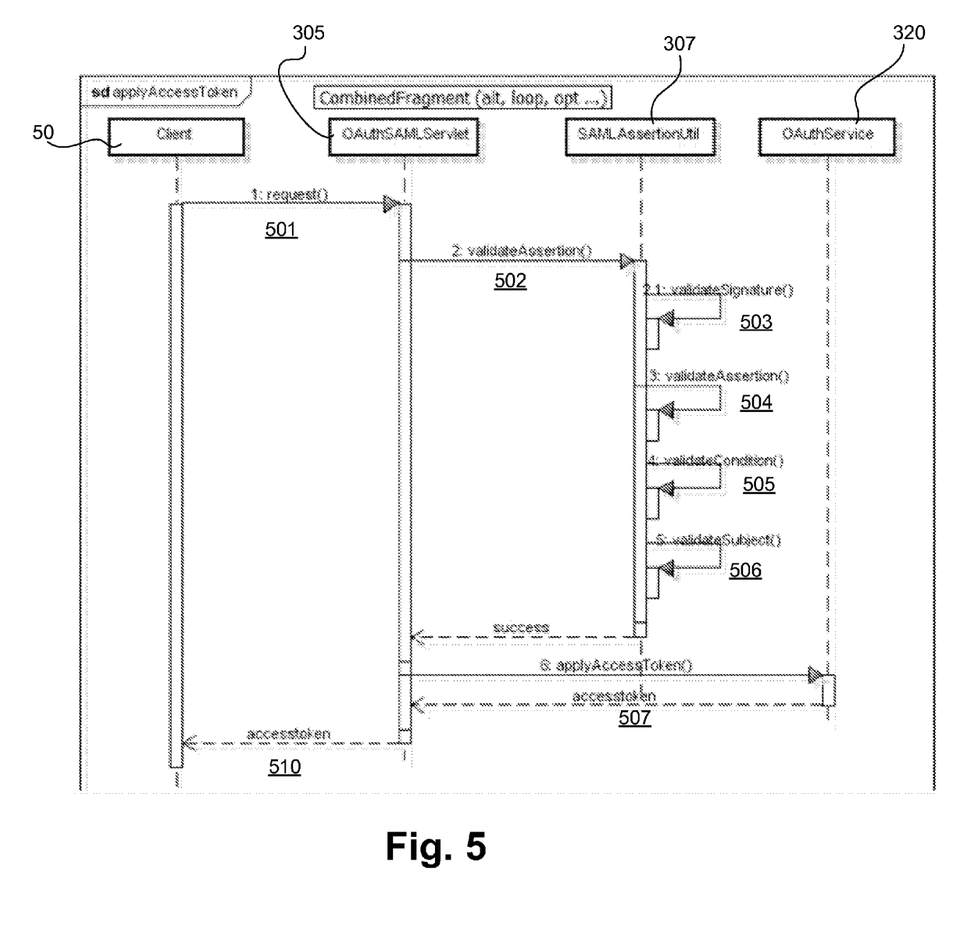
FIG. 5 illustrates an example apply access token flow diagram between network elements for identity management and authorization in accordance with embodiments of the present invention.

FIG. 5 illustrates an example apply access token flow diagram between network elements for identity management and authorization in accordance with embodiments of the present invention. The functionality of FIG. 5 corresponds to the "apply access token" functionality between EJB Stub 306 and EJB Skeleton 321 of FIG. 3.

At 501, the request is made for an SAML assertion from client 50 to servlet 305. Table 1 below provides a description of request parameters in accordance with one embodiment. In one embodiment, "base64url" is used to encode messages described herein. Base64url is a known encoding scheme disclosed in RFC4648.

TABLE 1

| Request Parameter | Required | Description | Type |
|---|---|---|---|
| grant_type | Y | The value of "grant_type" parameter MUST be "urn:ietf:params:oauth:grant-type:saml2-bearer" | String |
| client_id | N | client identifier | String |
| scope | N | The value is defined by the authorization server. | String |
| assertion | Y | The assertion being used as an authorization grant. The serialization MUST be encoded for transport within HTTP forms. It is RECOMMENDED that base64url be used | String |

At 510, a response to the request is received. Table 2 below provides a description of response parameters in accordance with one embodiment.

TABLE 2

| Response Parameter | Required | Description | Type |
|---|---|---|---|
| access_token | Y | The access token issued by the authorization server | String |
| token_type | Y | normally, "bearer" or "mac". But in the saml flow, the token type could be extended to be "bearer" or "saml-bearer" | String |
| expires_in | Y | The lifetime in seconds of the access token | String |
| scope | N | if identical to the scope requested by the client, otherwise REQUIRED | String |

The following pseudo code is an example of a Request/Response in accordance to one embodiment:

```
===>
    POST /token HTTP/1.1
    Host: Server.example.com
    Content-Type: application/x-www-form-urlencoded
    client_id=s6BhdRkqt3&
grant_type=
    urn%3Aoasis%3Anames%sAtc%3ASAML%3A2.0%3
    Aassertion&assertion=PHNhbWxwO1...
    [omitted for brevity]...ZT4
<==
    HTTP/1.1 200 OK
    Content-Type: application/json;charset=UTF-8
    Cache-Control: no-store
    Pragma: no-cache
    {
        "access_token":"2YotnFZFEjr1zCsicMWpAA",
        "token_type":"bearer",
        "expires_in":3600
    }
```

At 502, the validate assertion is requested, and at 503-506 the assertion is validated. The following pseudo code is an example SAML assertion validation in accordance with one embodiment:

```
<Assertion IssueInstant="2010-10-01T20:07:34.619Z"
ID="ef1xsbZxPV2oqjd7HTLRLIBlBb7"
Version="2.0"
xmlns="urn:oasis:names:to:SAML:2.0:assertion">
  <Issuer>https://saml-idp.example.com</Issuer>
  <ds:Signature xmlns:ds="http://www.w3.org/2000/09/xmldsig#">
  [...omitted for brevity...]
```

-continued

```
  </ds:Signature>
  <Subject>
    <NameID
      Format="urn:oasis:names:tc:SAML:1.1:nameid-
format:emailAddress">
      brian@example.com
    </NameID>
    <SubjectConfirmation
      Method="urn:oasis:names:tc:SAML:2.0:cm:bearer">
      <SubjectConfirmationData
        NotOnOrAfter="2010-10-01T20:12:34.619Z"
        Recipient="https://authz.example.net/token.oauth2"/>
    </SubjectConfirmation>
  </Subject>
  <Conditions>
    <AudienceRestriction>
      <Audience>https://saml-sp.example.net</Audience>
    </AudienceRestriction>
  </Conditions>
  <AuthnStatement AuthnInstant="2010-10-01T20:07:34.371Z">
    <AuthnContext>
      <AuthnContextClassRef>
        urn:oasis:names:tc:SAML:2.0:ac:classes:X509
      </AuthnContextClassRef>
    </AuthnContext>
  </AuthnStatement>
</Assertion>
```

At 503, the signature validation checks if the digital signature in the SAML assertion is the same as the preloaded signature and also if it has not expired.

At 504, 505, assertion conditions are checked to determine if the current time does not exceed the assertion permission period.

At 506, the assertion subject is checked to determine if the current time does not exceed the "SubjectConfirmation" permission period.

If the assertion passes the assertion validation (507), an access token is assigned (510) to the client so that the client can access the resources protected by the OAuth server.

Table 3 below provides a description of checkpoints and processing rules when validating an SAML Assertion in accordance with one embodiment.

TABLE 3

| Check Point | Processing Rule |
| --- | --- |
| Issuer | The Assertion's <Issuer> element MUST contain a unique identifier for the entity that issued the Assertion. OCSG will check it whether falling into the trusted issuers list. |
| Audience | The Assertion MUST contain <Conditions> element with an <AudienceRestriction> element with an <Audience> element containing a URI reference. The token endpoint URL of the authorization server MAY be used as an acceptable value for an <Audience> element. The authorization server MUST verify that it is an intended audience for the Assertion. |
| Subject | The Assertion MUST contain a <Subject> element. The subject MAY identify the resource owner for whom the access token is being requested. |
| NotOnOrAfter | The Assertion MUST have an expiry that limits the time window during which it can be used. The expiry can be expressed either as the NotOnOrAfter attribute of the <Conditions> element or as the NotOnOrAfter attribute of a suitable <SubjectConfirmationData> |
| Method | The <Subject> element MUST contain at least one <SubjectConfirmation> element that allows the authorization server to confirm it as a Bearer Assertion. Such a <SubjectConfirmation> element MUST have a Method attribute with a value of "urn:oasis:names:tc:SAML:2.0:cm:bearer". |
| Signature | The Assertion MUST be digitally signed by the issuer and the authorization server MUST verify the signature. OCSG should validate the signature and check the trusted certificate whether identical to the attached certificate in Assertion |

Figure 6:
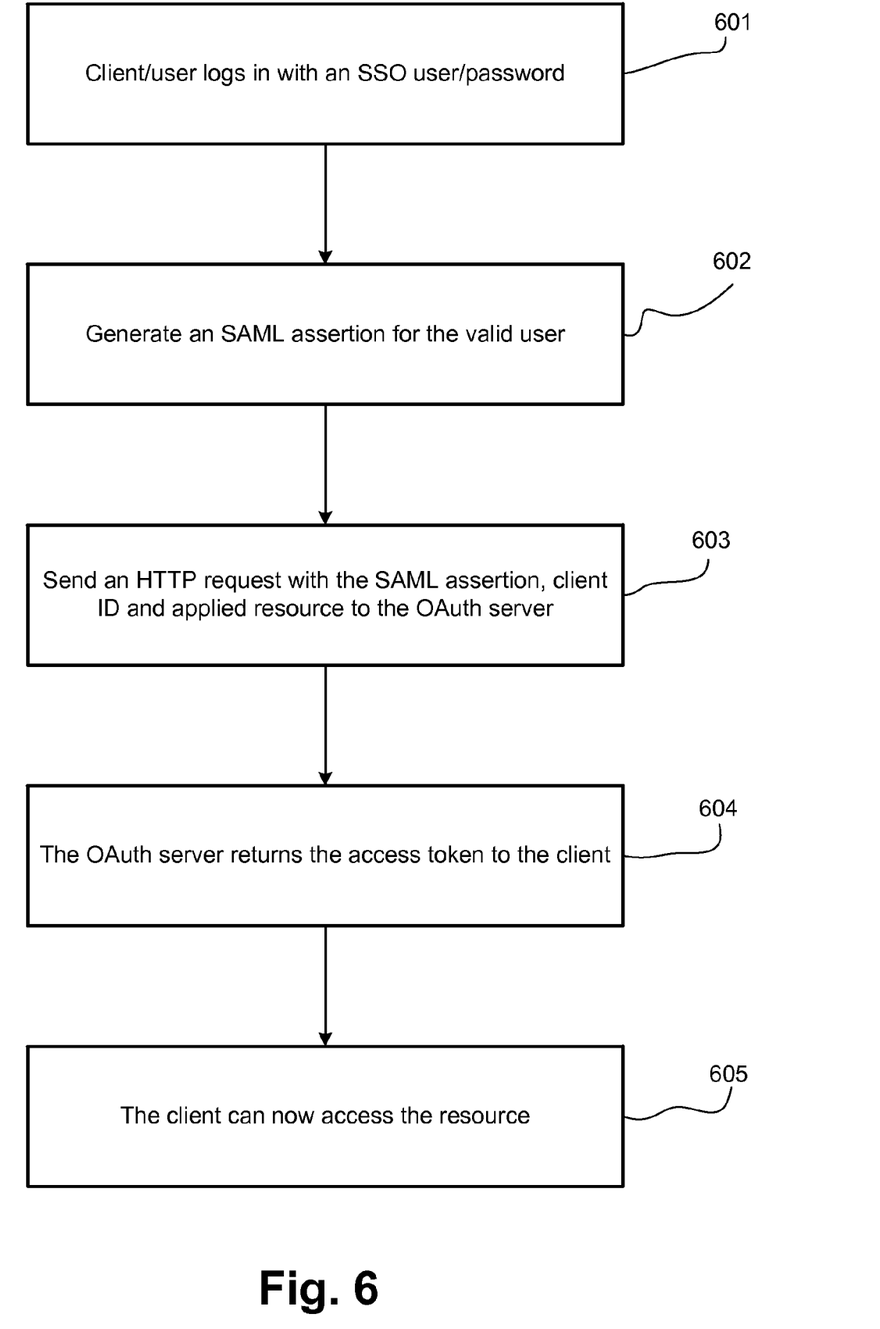
FIG. 6 is a flow diagram of the functionality of the system of FIG. 1 when providing authentication for resource access in accordance with one embodiment.

FIG. 6 is a flow diagram of the functionality of system 10 of FIG. 1 when providing authentication for resource access in accordance with one embodiment. In advance of the functionality of FIG. 6, a digital signature for every user in an existing identity management platform is created. A OAuth server imports all the digital signatures, and generates valid clients and assigns the corresponding resources for the clients.

At 601, a client/user logs into the system with an SSO user/password.

At 602, the system generates the SAML assertion for the valid user.

At 603, the system sends an HTTP request with the SAML assertion, client ID and applied resource to the OAuth server.

At 604, the OAuth server returns the access token to the client.

At 605, the client can now access the resource.

As disclosed, embodiments expand the OAuth server authentication ability and provides the standard interface to any identity management platform so that it can easily integrate with the existing identity management platform to implement the single sign-on function.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to authorize access to a resource by a client, the authorizing comprising:
   in response to receiving a single sign-on comprising a password, validating the client;
   receiving a request for a Security Assertion Markup Language (SAML) assertion at a Java servlet;
   generating the SAML assertion for the valid client;
   sending a Hypertext Transfer Protocol (HTTP) access request with the SAML assertion to an Open Authorization (OAuth) server, wherein the sending comprises transmitting an apply access token request from an Enterprise JavaBeans (EJB) stub to an EJB skeleton, wherein the EJB skeleton is adapted to issue access tokens or reload configurations;
   receiving at the Java servlet, in response to the sending, an access token for the resource from the OAuth server; and
   sending the access token to the client, wherein the access token enables the client to access the resource.

2. The non-transitory computer-readable medium of claim 1, wherein the Java servlet is packaged in a Web application Archive (WAR) file.

3. The non-transitory computer-readable medium of claim 1, wherein the access request comprises an identity of the client and an identity of the resource.

4. The non-transitory computer-readable medium of claim 1, further comprising an SAML MBean that manages an identity provider's certificate.

5. The non-transitory computer-readable medium of claim 1, further comprising synchronizing metadata associated with the client with the OAuth server.

6. The non-transitory computer-readable medium of claim 1, further comprising receiving configuration updates from a Java Message Service (JMS) publisher that is in communication with a JMS listener.

7. The non-transitory computer-readable medium of claim 1, wherein the validating the client comprises at least one of signature validation, checking assertion conditions or checking an assertion subject.

8. A computer implemented method of authorizing access to a resource by a client, the method comprising:
   in response to receiving a single sign-on comprising a password, validating the client;
   receiving a request for a Security Assertion Markup Language (SAML) assertion at a Java servlet;
   generating the SAML assertion for the valid client;
   sending a Hypertext Transfer Protocol (HTTP) access request with the SAML assertion to an Open Authorization (OAuth) server, wherein the sending comprises transmitting an apply access token request from an Enterprise JavaBeans (EJB) stub to an EJB skeleton, wherein the EJB skeleton is adapted to issue access tokens or reload configurations;
   receiving at the Java servlet, in response to the sending, an access token for the resource from the OAuth server; and
   sending the access token to the client, wherein the access token enables the client to access the resource.

9. The method of claim 8, wherein the Java servlet is packaged in a Web application Archive (WAR) file.

10. The method of claim 8, wherein the access request comprises an identity of the client and an identity of the resource.

11. The method of claim 8, further comprising an SAML MBean that manages an identity provider's certificate.

12. The method of claim 8, further comprising synchronizing metadata associated with the client with the OAuth server.

13. The method of claim 8, further comprising receiving configuration updates from a Java Message Service (JMS) publisher that is in communication with a JMS listener.

14. The method of claim 8, wherein the validating the client comprises at least one of signature validation, checking assertion conditions or checking an assertion subject.

15. A web server comprising:
   a processor;
   instructions stored on a memory device coupled to the processor that, when executed by the processor generate an authorization servlet that, in response to a request to access a resource by a client,
   validates the client in response to receiving a single sign-on comprising a password;
   receives a request for a Security Assertion Markup Language (SAML) assertion at a Java servlet;
   generates the SAML assertion for the valid client;
   sends a Hypertext Transfer Protocol (HTTP) access request with the SAML assertion to an Open Authorization (OAuth) server, wherein the sending comprises transmitting an apply access token request from an Enterprise JavaBeans (EJB) stub to an EJB skeleton, wherein the EJB skeleton is adapted to issue access tokens or reload configurations;
   receives at the Java servlet, in response to the sending, an access token for the resource from the OAuth server; and
   sends the access token to the client, wherein the access token enables the client to access the resource.

16. The web server of claim 15, further comprising synchronizing metadata associated with the client with the OAuth server.

17. The web server of claim 15, wherein the instructions, when executed by the processor, further receives configuration updates from a Java Message Service (JMS) publisher that is in communication with a JMS listener.

18. The web server of claim 15, further comprising an SAML MBean that manages an identity provider's certificate.

19. The web server of claim 15, wherein the access request comprises an identity of the client and an identity of the resource.

20. The web server of claim 15, wherein the validating the client comprises at least one of signature validation, checking assertion conditions or checking an assertion subject.

* * * * *

UNITED STATES PATENT AND TRADEMARK OFFICE
CERTIFICATE OF CORRECTION

PATENT NO. : 9,467,457 B2  
APPLICATION NO. : 14/595456  
DATED : October 11, 2016  
INVENTOR(S) : Si et al.

Page 1 of 1

It is certified that error appears in the above-identified patent and that said Letters Patent is hereby corrected as shown below:

On the Title Page

Column 2, under Other Publications, Line 3, delete "Idenity" and insert -- Identity --, therefor.

Signed and Sealed this
Sixth Day of June, 2017

Michelle K. Lee
*Director of the United States Patent and Trademark Office*